United States Patent [19]

Ohuchida et al.

[11] Patent Number: 5,101,389
[45] Date of Patent: Mar. 31, 1992

[54] OPTICAL INFORMATION RECORDING/REPRODUCING APPARATUS

[75] Inventors: Shigeru Ohuchida, Zama; Junichi Kitabayashi, Kawasaki; Hideo Maeda, Tokyo, all of Japan

[73] Assignee: Ricoh Company, Ltd., Tokyo, Japan

[21] Appl. No.: 561,782

[22] Filed: Aug. 2, 1990

[30] Foreign Application Priority Data

| Aug. 4, 1989 | [JP] | Japan | 1-202570 |
| Sep. 11, 1989 | [JP] | Japan | 1-235094 |
| Nov. 22, 1989 | [JP] | Japan | 1-304410 |
| Nov. 22, 1989 | [JP] | Japan | 1-304414 |
| Dec. 26, 1989 | [JP] | Japan | 1-337773 |
| Jan. 29, 1990 | [JP] | Japan | 2-18623 |
| Jun. 29, 1990 | [JP] | Japan | 2-172964 |

[51] Int. Cl.$^5$ .............. G11B 7/00; G01J 1/20
[52] U.S. Cl. .............. 369/44.23; 369/44.12; 369/112; 250/201.5
[58] Field of Search .......... 369/13, 109, 110, 112, 369/120, 44.23, 44.12; 350/162.17, 162.21, 162.22, 162.23, 162.24; 250/201.5

[56] References Cited

U.S. PATENT DOCUMENTS

| 3,698,795 | 8/1972 | Flint | 350/162.23 X |
| 4,475,792 | 8/1984 | Sica, Jr. | 350/162.17 X |
| 4,768,183 | 8/1988 | Ohnishi et al. | 369/120 X |
| 4,918,679 | 4/1990 | Opheij et al. | 369/44.23 X |

FOREIGN PATENT DOCUMENTS

| 0281124 | 11/1988 | Japan | 350/162.17 |
| 0281125 | 11/1988 | Japan | 350/162.17 |
| 0178154 | 7/1989 | Japan | 369/109 |

Primary Examiner—Roy N. Envall, Jr.
Assistant Examiner—Nabil Hindi
Attorney, Agent, or Firm—Cooper & Dunham

[57] ABSTRACT

An optical information recording/reproducing apparatus comprises a semi-reflecting means which receives a emitted laser light emitted from a light source, which reflect partially the received laser light toward an optical information recording medium in order to record an information, and which transmits a reflected laser light reflected by the optical information recording medium, a separating means which has the semi-reflecting means on one surface thereof, which diffracts a part of the transmitted laser light, transmits the other part of the transmitted laser light, and then subsequently diffracts said diffracted light again to produce twice diffracted light and transmits said transmitted light again to produce twice transmitted light, and a detecting means which detects the diffracted laser light and the transmitted laser light to thereby generate an information reproduction signal, a track error signal and a focus error signal.

18 Claims, 17 Drawing Sheets

Fig. 3
PRIOR ART
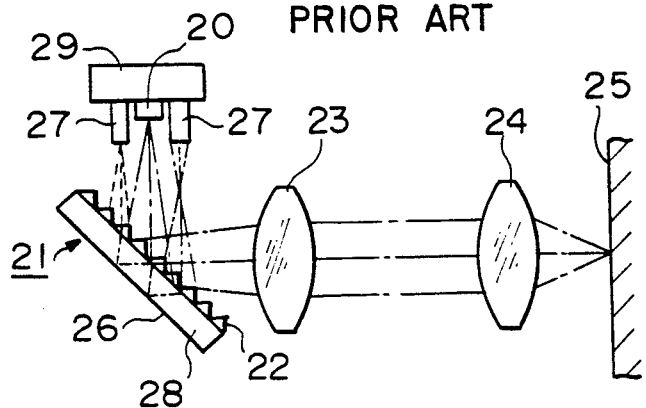
Fig. 4
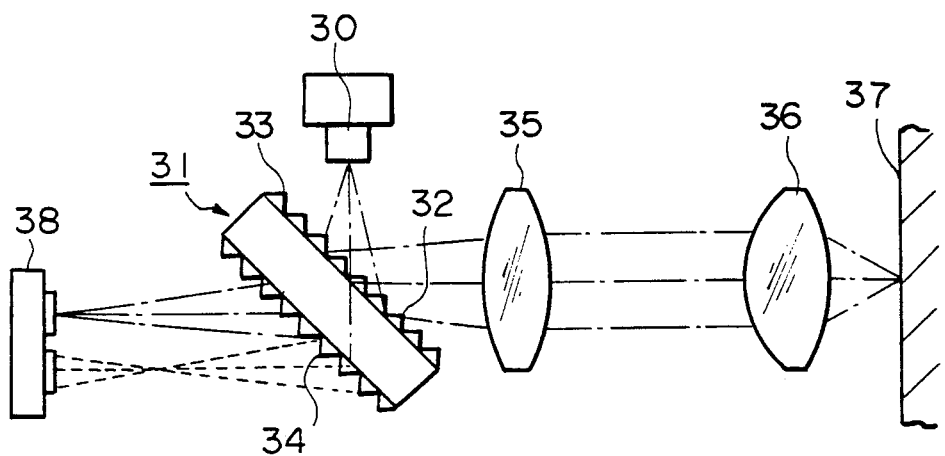
Fig. 5A     Fig. 5B     Fig. 5C
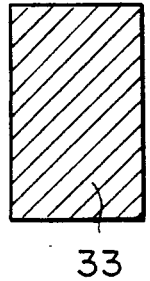 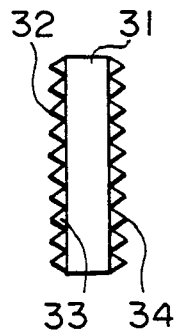 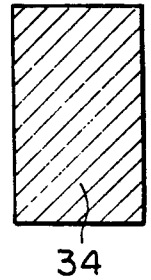

Fig. 6
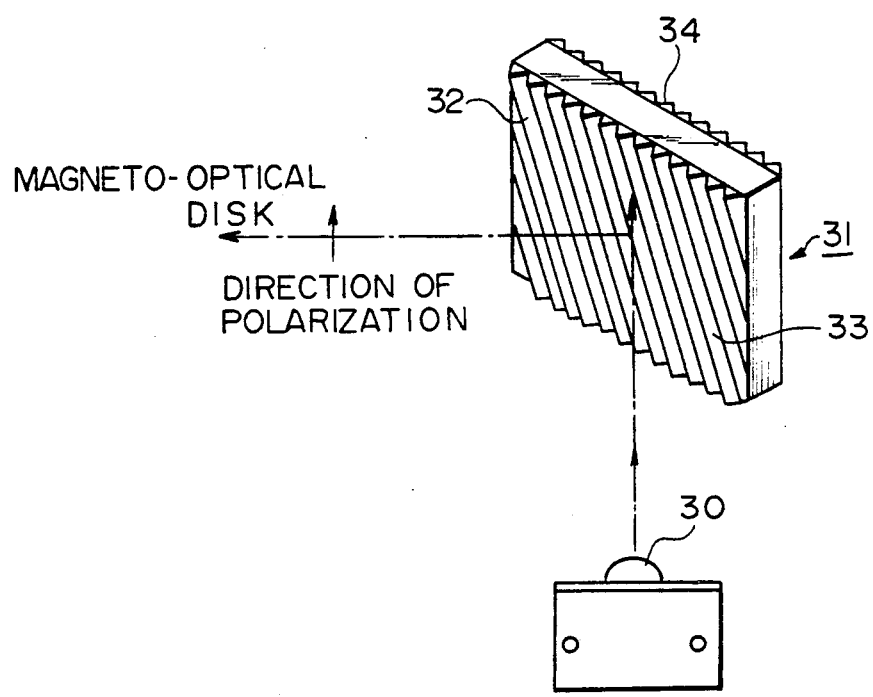
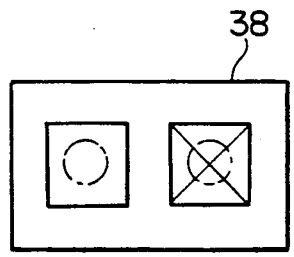
Fig. 7A
ASTIGMATIC
METHOD
(0-ORDER LIGHT)
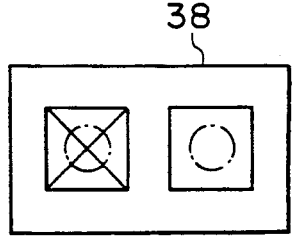
Fig. 7B
ASTIGMATIC
METHOD
(I-ORDER LIGHT)
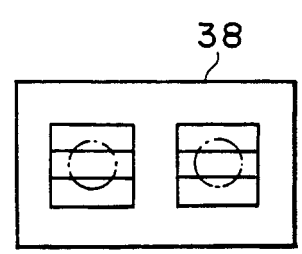
Fig. 7C
BEAM SIZE
METHOD

DIRECTION OF POLARIZATION

INTENSITY OF LIGHT

0-ORDER LIGHT

1-ORDER LIGHT

DIFFERENCE BETWEEN GRATING DIRECTION AND POLARIZATION DIRECTION

DIRECTION OF POLARIZATION $Fo = (a-b)+(d-c)$
$Tr = e-f$
$Mo = (a+b+c+d)-(e+f+g+h)$

DIRECTION OF POLARIZATION
OF EMITTED LIGHT

Fig. 35
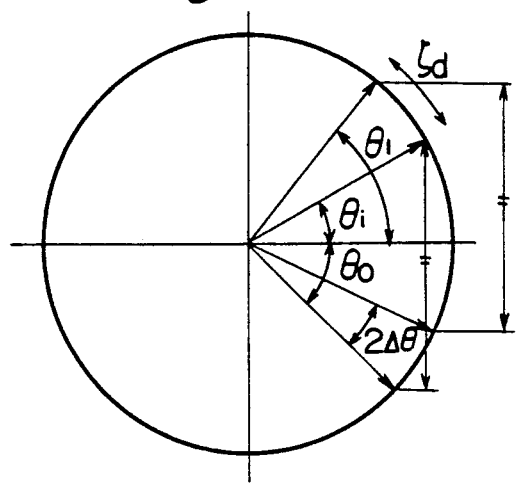
Fig. 36A     Fig. 36B
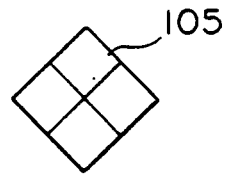  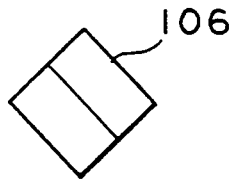
Fig. 37A     Fig. 37B
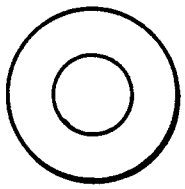  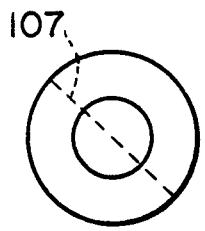
Fig. 38
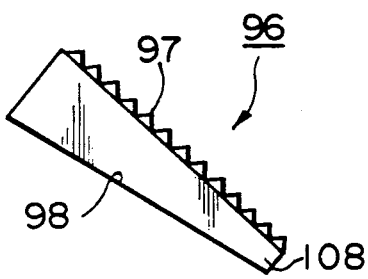

OPTICAL INFORMATION RECORDING/REPRODUCING APPARATUS

BACKGROUND OF THE INVENTION

1. Field of the Invention

The present invention relates to an optical information recording/reproducing apparatus for recording information or the like by using an optical information recording medium, and, more particularly, to an optical information recording/reproducing apparatus for performing a tracking servo and/or a focus servo.

2. Description of the Related Art

The structures of an optical information recording/reproducing apparatuses will be described. A first related art arranged in such a manner that a diffraction grating is employed as a luminous separation means of a light is constituted in such a manner that laser beams emitted from a semiconductor laser are paralleled by a collimate lens, then the laser beams are made incident upon a beam splitter. In this case, since the direction of the polarization of the incidental a light is parallel to the grooves formed in the beam splitter, the light is diffracted before the light is made incident upon a quarter wavelength plate, then the light becomes a circularly polarized wave. The circularly polarized wave is converged by a lens so as to be irradiated to an optical disk. As a result, recording or the like of information is performed. A light reflected from the optical disk is converted into a linearly polarized wave by the quarter wavelength plate, then the wave transmits the beam splitter so as to be introduced into a signal detecting optical system. Then the linearly polarized wave is made incident upon a critical angle diffracting grating. The incidental light twice generates the critical angle diffraction and total reflection to thereby become a diffracted light, then the light is made incident upon a light receiving element which is divided into four sections. Since the light is detected by the light receiving device, information is reproduced and a focus error signal and a track error signal are detected.

A second related art employs a dual type diffracting grating. A light emitted from a semiconductor laser are paralleled by a collimate lens, then are reflected by a beam splitter via two shaping prisms so as to be converged by an objective lens and are irradiated to a magneto-optical disk. As a result, recording of information or the like is performed. Light reflected by the disk is introduced into a signal detection optical system after the light transmits through the beam splitter so as to be converged by a convergent lens. Then, the light transmits a diffraction grating formed on the both sides of the diffraction grating or the light is diffracted. A 0-order light which is moved straight after the light transmits through the diffraction grating is introduced into a four-sectioned light receiving element. The diffracted 1-order light is introduced into a two-sectioned light receiving element. A magneto-optic signal which serves as a reproduction signal is detected by the difference in the quantity between the 0-order light and the 1-order light. A focus error signal is detected by using the 0-order light by an astigmatic method, while a track error signal is detected by using the 1-order light by a push-pull method or the like.

A third related art will be described. Beams emitted from a semiconductor laser, as a laser light source, are paralleled by a collimate lens. Then, the thus formed parallel light is reflected by an optical path separation means so as to be converged by an objective lens, then is irradiated to a magneto-optical disk, as an optical information recording medium. As a result, recording of information is performed. A light reflected by the magneto-optical disk passes through the luminous separating means so as to be introduced into a signal detecting optical system, then is detected by a light receiving device. As a result, a reproduction of information and detections of a focus error signal and a track error signal are performed.

A fourth related art will be described.

A light emitted from a semiconductor laser is reflected by a diffraction grating formed on one side of a luminous separating element so as to be paralleled by a collimate lens. The thus formed parallel light is converged by an objective lens, then is irradiated applied to the surface of the magneto-optical disk. As a result, recording of information is performed. A light reflected by the disk successively transmits the objective lens and the collimate lens. Then, the reflected light passes through the diffraction grating of the luminous separating element so as to be divided into a 0-order light and an 1-order light. The thus divided 0-order light and the 1-order light are reflected by a total reflection surface formed on the reverse side of the luminous separating element, again transmit through the diffraction grating so as to be emitted outwards. As a result, the 0-order light and the 1-order light are caused to have different length of optical paths. Therefore, these lights are introduced respectively into two light receiving devices disposed on the same plane, so that each of the signals can be detected.

The problems experienced with a conventional optical information recording/reproducing apparatus will be described.

A first problem will be described. In the case of the first related art in which an additional writing type optical disk or a CD can be applied to an optical information recording medium, it has no function of detecting a magneto-optic signal. Therefore, it cannot be used as a rewriting optical disk head.

A second problem will be described. In the case of the second related art in which a dual type diffraction grating is employed so as to emit a 0-order light and an 1-order light, which pass through the dual type diffraction grating to thereby be formed, in substantially the same direction, the size of the signal detecting optical system can be, to a certain degree, reduced. However, the necessity of providing optical parts such as a beam splitter and a condenser lens cannot be eliminated. Therefore, the overall size and weight of the apparatus cannot be satisfactorily reduced.

A third problem will be described. In the case of the third related art in which a luminous flux separating means is employed so that a luminous flux including an emitted light emitted from a laser light source and a reflected light reflected from the magneto-optical disk are separated from each other, the luminous flux separating means usually comprises a prism such as a beam splitter. However, a subject to reduce the size and weight of the optical pickup optical system has become important recently for the purpose of shortening the access time. In order to solve this subject, it might therefore be feasible to employ a structure of the luminous flux separating means in which as dual diffraction grating having diffraction gratings on both sides thereof is employed. As a result of the employment of the dual diffraction grating, the number of the parts and the space for the overall body of the optical pickup optical system can be reduced. Furthermore, the seeking transfer can be speedy.

However, the diffraction grating formed on the dual type diffraction grating can be easily influenced by the change in the wavelength. What is even worse, the shape of the grating can be easily got out since the surface on which the diffraction grating is formed is brittle. Therefore, the accuracy of the wave surface for reflecting, transmitting and diffracting can be deteriorated. Therefore, the converging spot may be undesirably enlarged, causing an accurate information recording/reproducing not to be performed.

A fourth problem will be described. In the case of the second related art arranged in such a manner that the overall optical system is divided into the light emitting optical system and a signal detecting optical system, the parts for the overall body increase in number, causing the overall cost to be raised excessively.

A fifth problem will be described. In the case of the fourth related art in which a semiconductor laser and a light receiving device are integrally formed and the change in the diffraction angle against the change in the wavelength, by using a piece of diffraction grating, can be prevented similarly to the structure in which two diffraction gratings are used. The separation of the light illuminating the magneto-optical disk and the light reflected by the magneto-optical disk is determined depending upon the thickness of the substrate. Therefore, the design freedom is restricted by the interval between the light emitting point and the light receiving point and the focusing sensitivity. Furthermore, the adjusting, the assembling and the manufacturing of the elements cannot be easily performed. Furthermore, the light utilization efficiency can be reduced by the reflection of light on the surface of the diffraction grating.

A sixth problem will be described. In the case of the fourth related art in which a beam separating element having a diffraction grating and a total reflecting surface is employed, the number of the parts for the optical system can be reduced and the space can thereby be saved. However, the two light receiving elements for detecting the transmitted light and the diffracted light are mounted on one substrate in such a manner that the two light receiving devices hold the semiconductor laser therebetween. Therefore, it is excessively difficult to adjust closely the position of the above-described two light receiving elements and the semiconductor laser. Furthermore, since the distance between the mounting substrate and the semiconductor laser and the distance between the mounting substrate and the light receiving elements are different from each other, a height adjusting device must be additionally provided. Since the light receiving elements are disposed on the two sides of the semiconductor laser. There are problems that the assembling and the adjusting of the light receiving elements cannot be easily completed and take a long time.

SUMMARY OF THE INVENTION

It is therefore an object of the present invention to provide an optical information recording/reproducing apparatus in which information can be reproduced and a track error signal and a focus error signal can be detected in addition that the above described problems are solved.

The object of the invention can be achieved by an apparatus comprising a light source for emitting a laser light, a semi-reflecting means disposed on an optical path of the emitted laser light for receiving the emitted laser light, for reflecting partially the received laser light toward an optical information recording medium in order to record an information, and for transmitting a reflected laser light reflected by the optical information recording medium, a separating means having the semi-reflecting means on one surface thereof, the separating means for diffracting a part of the transmitted laser light twice and for transmitting the other part of the transmitted laser light twice, and a detecting means being adapted to detect the diffracted laser light and the transmitted the other part of the transmitted laser light to thereby generate an information reproduction signal, a track error signal and a focus error signal.

Advantages of the present invention will be described.

According to the present invention, a laser light emitted from a laser source is reflected partially by a semi-reflecting means disposed on one surface of a separating means. Then, the reflected laser light is reflected by an optical information recording medium before introduced into the separating means. Then, the reflected laser light reflected by the medium is divide into transmitted laser light and diffracted laser light. Thus divided two laser lights are detected by a detecting means, so that an information can be reproduced and a track error signal and a focus error signal can be detected.

Further objects and advantages of the present invention will be apparent from the following description of the preferred embodiments of the invention as illustrated in the accompanying drawings.

BRIEF DESCRIPTION OF THE DRAWINGS

FIG. 3 is a structural view which illustrates a fourth related art;

FIG. 4 is a structural view which illustrates a first embodiment of the present invention;

FIG. 5A is a structural view which illustrates a surface diffraction grating;

FIG. 5B a structural view which illustrates a dual type diffraction grating;

FIG. 5C is a structural view which illustrates a reverse diffraction grating;

FIG. 6 illustrates the dual type diffraction grating when viewed form a portion behind a laser source;

FIG. 7A illustrates a first method a principle of detecting a focus error signal by a light receiving element;

FIG. 7B illustrates a second method of detecting a focus error signal by a light receiving element.

FIG. 35 illustrates a variety of diffraction angles;

FIG. 36A is a front elevational view which illustrates the light receiving element 105;

FIG. 36B is a front elevational view which illustrates the light receiving element 106;

FIG. 37A is a side elevational view which illustrates a modification to the light receiving element; and FIG. 37B is a side elevational view which illustrates a separation line on the light receiving element shown in FIG. 37A;

FIG. 38 is a front elevational view which illustrates a modification to the luminous separating means.

DESCRIPTION OF THE PREFERRED EMBODIMENTS

Figure 1:
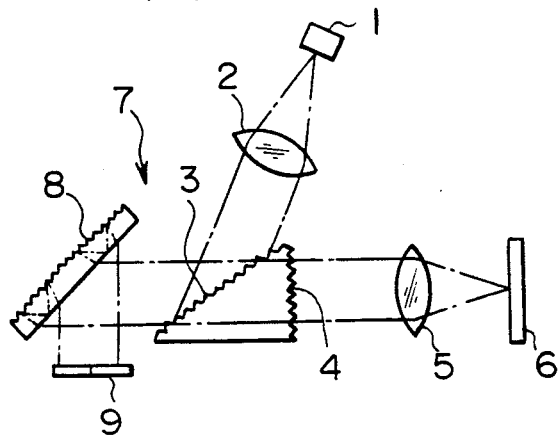
FIG. 1 is a structural view which illustrates a first related art.

The structures of an optical information recording-/reproducing apparatuses will be described with reference to FIGS. 1, 2A, 2B and 3. A first related art arranged in such a manner that a diffraction grating is employed as a luminous separating means is, as shown FIG. 1, constituted in such a manner that laser beams emitted from a semiconductor laser 1 are paralleled by a collimate lens 2, then the laser beams are made incident upon a beam splitter 3. In this case, since the direction of the polarization of the incidental light is parallel to the grooves formed in the beam splitter 3, the light is diffracted before the light is made incident upon a quarter wavelength plate 4, then the light becomes a circularly polarized wave. The circularly polarized wave is converged by a lens 5 so as to be irradiated to an optical disk 6. As a result, recording or the like of information is performed. A light reflected from the optical disk 6 is converted into a linearly polarized wave by the quarter wavelength plate 4, then the wave transmits the beam splitter 3 so as to be introduced into a signal detecting optical system 7. Then the linearly polarized wave is made incident upon a critical angle diffracting grating 8. The incidental light twice generates the critical angle diffraction and total reflection to thereby become a diffracted light, then the light made incident upon a light receiving element 9 which is divided into four sections. Since the light is detected by the light receiving device 9, information is reproduced and a focus error signal and a track error signal are detected.

Figure 2A:
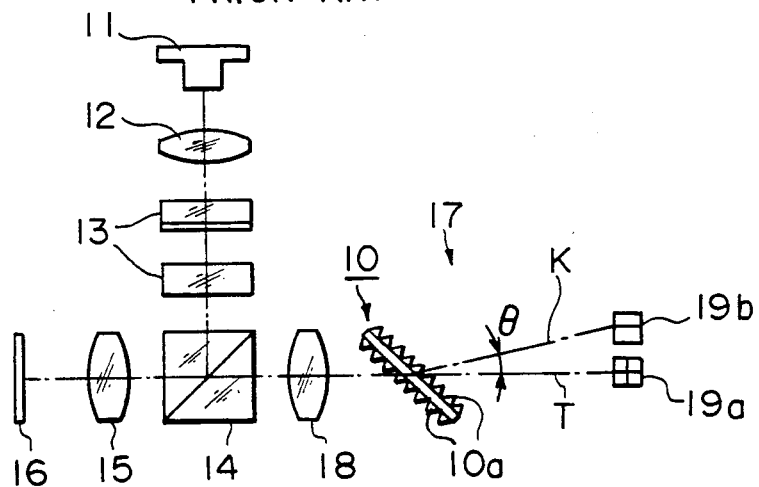
FIG. 2A is a structural view which illustrates a second related art.
Figure 2B:
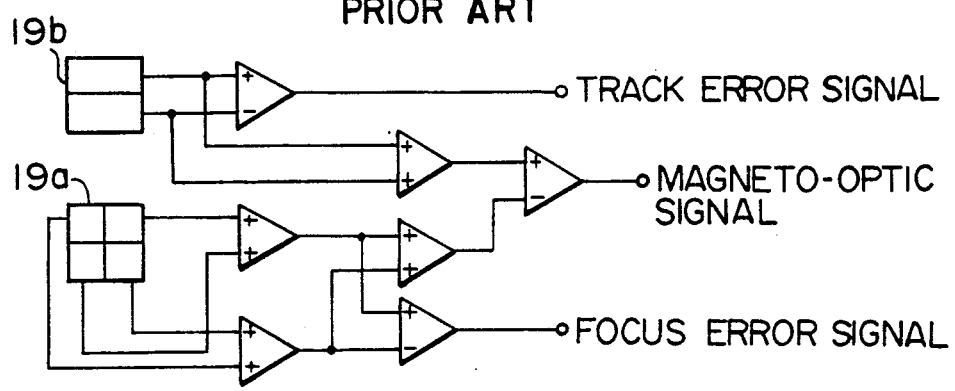
FIG. 2B is a circuit diagram which illustrates a circuit connected to a 4-sectioned light receiving element.

FIG. 2A and 2B shows a second related art in which a dual type diffracting grating 10 is employed. A laser light emitted from a semiconductor laser 11 are paralleled by a collimate lens 12, then are reflected by a beam splitter 14 via two shaping prisms 13 so as to be converged by an objective lens 15 and are irradiated to a magneto-optic disk 16. As a result, recording of information or the like is performed. Light reflected by the disk 16 is introduced into a signal detection optical system 17 after the light transmits through the beam splitter 14 so as to be converged by a convergent lens 18. Then, the light transmits a diffraction grating 10a formed on the both sides of the diffraction grating 10 or the light is diffracted. A 0-order light T which is moved straight after the light transmits through the diffraction grating 10a is introduced into a four-sectioned light receiving element 19a. The diffracted 1-order light K is introduced into a two-sectioned light receiving element 19b. A magneto-optic signal which serves as a reproduction signal is detected by the difference in the quantity between the 0-order light T and the 1-order light K. A focus error signal is detected by using the 0-order light T by an astigmatic method, while a track error signal is defected by using the 1-order light K by a push-pull method or the like.

A third related art will be described. Beams emitted from a semiconductor laser, as a laser light source, are paralleled by a collimate lens. Then, the thus formed parallel light is reflected by an optical path separation means so as to be converged by an objective lens, then is irradiated to a magneto-optic disk, as an optical information recording medium. As a result, recording of information is performed. A light reflected by the magneto-optical disk passes through the luminous separating means so as to be introduced into a signal detecting optical system, then is detected by a light receiving device. As a result, a reproduction of information and detections of a focus error signal and a track error signal are performed.

A fourth related art will be described with reference to FIG. 3.

A laser light emitted from a semiconductor laser 20 is reflected by a diffraction grating 22 formed on one side of a luminous separating element 21 so as to be paralleled by a collimate lens 23. The thus formed parallel light is converged by an objective lens 24, then is irradiated applied to the surface of the magneto-optical disk 25. As a result, recording of information is performed. A light reflected by the disk 25 successively transmits the objective lens 24 and the collimate lens 23. Then, the reflected light passes through the diffraction grating 22 of the luminous separating element 21 so as to be divided into a 0-order light T and an 1-order light K. The thus divided 0-order light T and the 1-order light K are reflected by a total reflection surface 26 formed on the reverse side of the luminous separating element 21, again transmit through the diffraction grading 22 so as to be emitted outwards. As a result, the 0-order light T and the 1-order light K are caused to have different length of optical paths. Therefore, these lights are introduced respectively into two light receiving devices 27 disposed on the same plane, so that each of the signals can be detected.

Preferred embodiments of the present invention will be described.

Figure 8:
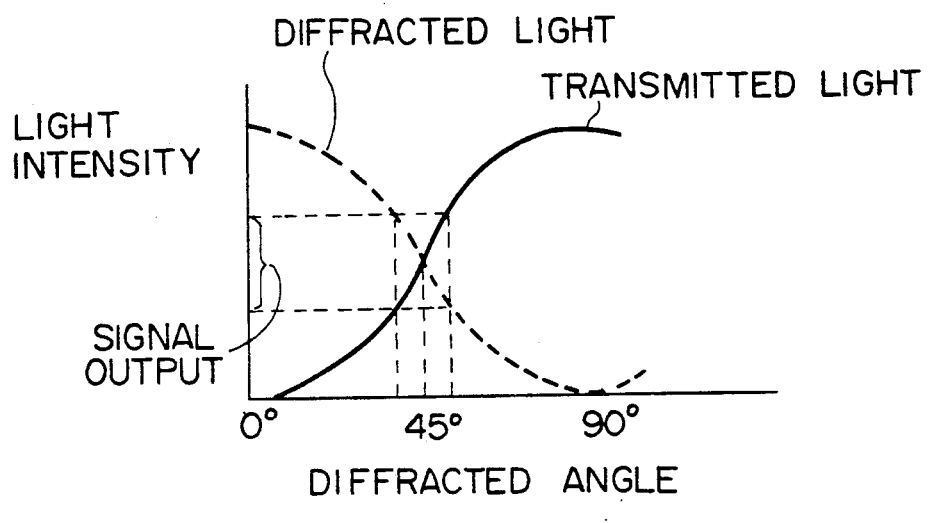
FIG. 8 illustrates waveforms which shows the polarization dependency of the diffraction efficiency of a high density diffraction grating.

A first embodiment will be described with reference to FIGS. 4 and 8. This embodiment is arranged for the purpose of overcoming the above-described first and second problems.

A dual type diffraction grating 31, which serves as the luminous separating means, is disposed on an optical path through which a laser light, emitted from a semiconductor laser 30, which serves as a laser light source, passes. A surface diffraction grating 33, which has, on the surface thereof, a semi-reflecting film 32 which partially reflect light made incident upon its surface positioned in a side of the laser 30, is formed on the diffraction grating 31. A reverse diffraction grating 34 as a second diffraction member is formed on the surface confronting the surface diffraction grating 33. The diffraction gratings 33 and 34 respectively formed on these both sides are arranged in such a manner that the diffraction efficiency is changed by the direction of polarization. On the optical path formed in a side of the diffraction grating 33, a collimate lens 35, an objective lens 36 and a magneto-optic disk 37 are successively disposed. On the optical path formed in a side of the diffraction grading 34, a light receiving device 38 for detecting a focus error signal, a track error signal and the like is disposed. A light emitted from the laser 30 is reflected by a semi-reflecting film 32 formed on the diffraction grating 33. The semi-reflecting film 32 is formed in such a manner that it enables desired optical power to be irradiated to a surface of the disk 37. A light reflected by the semi-reflecting film 32 is paralleled by the collimate lens 35. Since the thus formed parallel light is mere reflected light and is not a light diffracted by the diffraction grating 33, aberration is not generated. Therefore, the necessity of arranging the shape of the diffraction grating 33 to a curved shape or a modulation pitch shape can be eliminated. The parallel light is converged by the lens 36 so as to be irradiated, in a spot shape, to the surface of the magneto-optical disk 37. The thus irradiated light is reflected by a Kerr effect in the condition with its direction of polarization inclined in response to an information signal on the disk 37. The reflected light is again supplied to the lens 35 so as to be made converged light, then is made incident upon the diffraction grating 33. The diffraction grating 31 is disposed in such a manner that the diffraction gratings 33 and 34 formed on its both sides make a black angle with respect to the light reflected by the disk 37. That is, as shown in FIG. 8, the diffraction gratings 33 and 34, formed on the both sides of the diffraction grating 31, are arranged so as to make angle 45° with respect to the direction of polarization of light supplied from the laser 30. The light made incident upon the diffraction grating 33 is divided into transmitted light T and diffraction light K, then made incident upon the diffraction grating 34. The diffraction grating 34 is a transmissive type diffraction grating arranged in such a manner that the grating direction of the diffraction grating 34 is the same as the grating direction of the diffraction grating 33. The light (0-order light) which has transmitted the diffraction grating 33 transmits the diffraction grating 34 so as to become a 0-order light since it. The diffracted by the diffraction grating 33 is also diffracted by the diffraction grating 34 so as to become an 1-order light K. The divided the 0-order light T and the 1-order light K is received by a light receiving device 38. As a result, an optical information signal, a focus error signal and a track error signal can be detected by utilizing the difference in the optical intensity between the 0-order light T and the 1-order light K.

As to the method detecting the focus error signal, firstly an astigmatic method as shown in FIG. 7A which employs a parallel flat plates for utilizing a 0-order light T, secondly an astigmatic method as shown in FIG. 7B in which the diffraction gratings 33 and 34 are arranged to be modulation pitch shape for utilizing the 1-order light K, thirdly a beam size method as shown in FIG. 7C in which the difference in the optical paths disposed between the 0-order light T and the 1-order light K is utilized and the like are put up. As to the method detecting the track error signal, in a case where the track error signal is detected by a push-pull method, the track error is detected by the two-sectioned element 38, and in a case where the track error signal is detected by a sample servo method, the intensity of the reflected light can be received by the element 38.

As described above, the structure of this embodiment is arranged in such a manner that the diffraction grating 31 is provided so as to pass light twice. Therefore, the spot positional deviation due to the change in the wavelength can be prevented. Furthermore, the semi-reflecting film 32 is formed on one side of the surface diffraction grating 33. As a result, the light for the light emitting optical system and the signal detection optical system can be separated from each other simply by providing the diffraction grating 31. Therefore, the number of the optical parts can be significantly reduced. As a result, the size and the weight of the overall apparatus can be reduced. Furthermore, the cost can be reduced.

Figure 9:
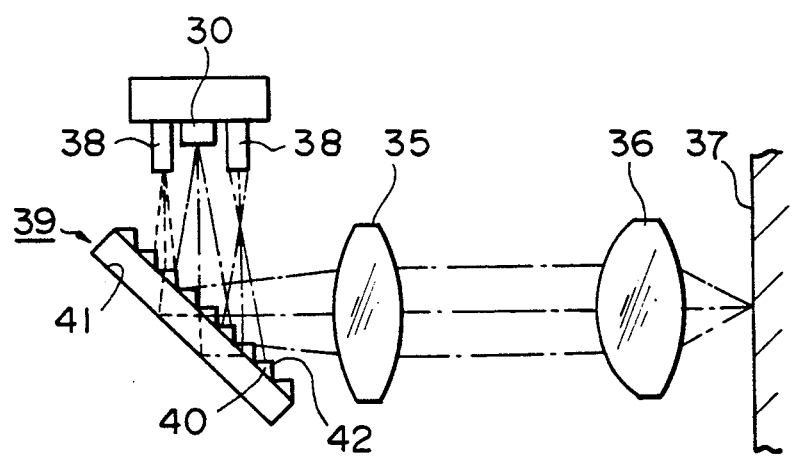
FIG. 9 is a structural view which illustrates a second embodiment of the present invention.

Then, a second embodiment will be described with reference to FIG. 9. This embodiment is intended to overcome the first and the second problems. The same elements as those according to FIG. 4 are given the same reference numerals. A diffraction grating 39 has, on a surface in a side of the laser 30, a diffraction grating 40 which the diffraction efficiency thereof is changed depending upon the direction of polarization. A total reflecting surface 41 is formed on the side opposite to the side on which the diffraction grating 40 is formed. The diffraction grating 40 has a semi-reflecting film 42 having a predetermined reflectivity which enables a desired level power of a laser light to be irradiated to the disk 37. The element 38 is integrally formed with the laser 30 in a side of the diffraction grating 40. The diffraction grating 39 is disposed so as to make a black angle with respect to the light reflected by the disk 37.

A laser light emitted from the laser 30 is reflected by the semi-reflecting film 42 on the diffraction grating 40, then is made a parallel light by the lens 35. The parallel light is converged by the lens 36 so as to be irradiated to the surface of the disk 37. As a result, reading of the information signal can be performed. A light reflected by the disk 37 is again supplied to the diffraction grating 40, then the light is divided into the 0-order light T and the 1-order light K, and then the 0-order light T and the 1-order light K are reflected by the total reflecting surface 41 formed on the reverse side of the diffraction grating 40. Then, the 0-order light T and the 1-order light K again pass through the diffraction grating 40 so as to be detected by the element 38 integrally formed with the laser 30. As a result, the reproduction of an information signal and detections of a focus error signal and a track error signal can be performed. Since the method to detect these signals has been described in the embodiment according to FIG. 4, its description is omitted.

According to this embodiment, the diffraction grating 40 is formed on only one side, the diffraction grating 40 can be easily manufactured and handled. Furthermore, since a light is returned to the light emitting optical system by the total reflecting surface 41 formed on the reverse side of the diffraction grating 40, the laser 30 and the element 38 can be integrally formed. Therefore, the number of the parts can be reduced and the overall size can thereby be reduced.

Figure 10:
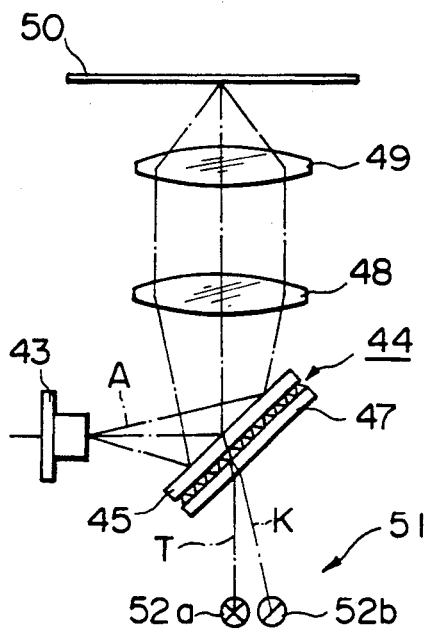
FIG. 10 is a structural view which illustrates a third embodiment of the present invention.
Figure 11:
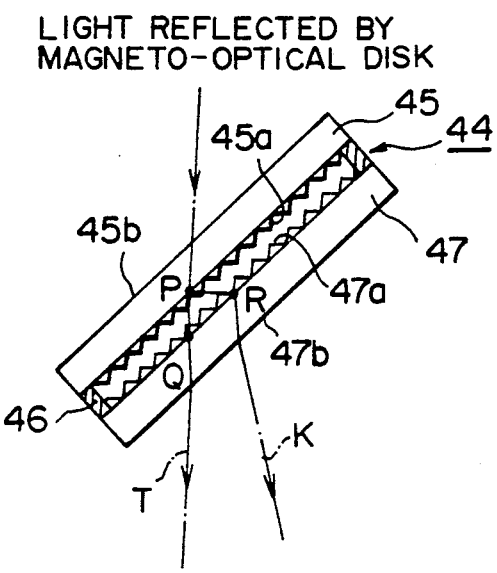
FIG. 11 is a side elevational view which illustrates the state of an optical path for light made incident upon the dual type diffraction grating and separated there.

Then, a third embodiment will be described with reference to FIGS. 10 and 11.

This embodiment is intended to overcome the third problem.

A dual type diffracting grating 44 serving as a dual diffracting grating element is formed on the optical path through which a laser light emitted from the semiconductor laser 43 passes, the semiconductor laser 43 serving as a laser light source. As shown in FIG. 11, the diffraction grating 44 comprises a semi-reflecting first substrate 45 on which a first diffraction grating 45a is formed on one side thereof, the first diffraction grating 45a serving as a first diffraction member, and a transmissible second substrate 47 on which a second diffraction grating 47a is formed on the opposite side to the first diffraction grating 45a via a spacer 46, the diffraction member. A collimate lens 48 and an objective lens 49 are successively disposed in a side of the substrate 45. A disk 50 serving as an optical information recording medium is disposed at a position confronting the lens 49. A signal detecting optical system 51 positioned on the diffraction grating 44 in a side of the substrate 47 includes a 4-sectioned light receiving element 52a and a 2-sectioned light receiving element 52b. A surface 45b of the diffraction grating 44, on which the diffraction grating 45a is not formed and upon which light is made incident, is finished an accurate semi-reflecting polishing surface. Therefore, the reflected wave surface cannot be disordered. Furthermore, a surface 47b of the substrate 47, on which the diffraction grating 47a is not formed and from which a light is emitted, is applied with non-reflection coating or the like for the purpose of preventing an irregular reflection.

A divergent light A emitted from the laser 43 is reflected by the surface of the semi-reflecting substrate 45 of the diffraction grating 44 so as to be paralleled by the lens 48. Then, the parallel light is converged by the lens 49, then be irradiated to the surface of the disk 50. As a result, information is recorded. Light reflected by the disk 50 is introduced into the diffraction grating 44 after light has successively passed through the lens 49 and the lens 48. The reflected light made incident upon the diffraction grating 44 is, as shown in FIG. 11, divided into the transmitted light (the 0-order light) T and the diffracted light (the 1-order light) K by the diffraction grating 45a of the substrate 45 (at point P). The 0-order light T passes through the spacer 46 and further transmits the diffraction grating 47a formed on the substrate 47 (at point Q). The 1-order light K passes through the spacer 46 and is then diffracted by the diffraction grating 47a formed on the substrate 47.

In the 0-order light T and the 1-order light K introduced into the signal detecting optical system 51, the 0-order light T is brought to a state in which astigmatism is generated since the thickness of the substrate of the diffraction grating 44 is relatively large. Therefore, the focus error signal can be detected by using the device 52a by the astigmatic method. Also the 1-order light T is brought to a state in which an astigmatism is generated. In this case the astigmatism can be cancelled by the action of the diffraction grating. Therefore, the track error signal can be detected by using the element 52b by the push-pull method. Furthermore, owing to the polarization separating characteristics of the diffraction gratings 45a and 47a disposed at a small pitch, the magneto-optical signal can be detected by making comparison intensities of the two lights respectively detected by the element 52a and 52b.

As described above, the structure is arranged in such a manner that the astigmatism is generated in only either the 0-order light T or the 1-order light K by using the diffraction grating 44 having the semi-reflecting surface 45b and two diffraction gratings 45a and 47a therein. Therefore, the diffraction grating can be sealed on its inside. As a result, shape of the grating can be stabilized. Furthermore, since the two diffraction gratings are disposed adjacently to each other, the influence of the shift change of the 1-order light due to the wavelength change can be reduced. Therefore, the reliable signal can be always stably detected. In addition, one surface of the diffraction grating 44 is arranged to be the semi-reflecting surface 45b. Therefore, an accurate beam splitter function can be realized. As a result, the number of the parts for the optical system can be reduced and the size and the weight can thereby be reduced. In addition, high speed seeking movement can be realized. Therefore, the accessing time can be further shortened.

A fourth embodiment will be described with reference to FIG. 12. This embodiment is intended to overcome the third problem. The lens 48 is disposed on the optical path between the laser 43 and the diffraction grating 48. Furthermore, a condenser lens 53 is disposed in a side of the substrate 47 of the diffraction grating 44.

As a result, a laser light emitted from the lens 43 is made incident upon the diffraction grating 44 with paralleled by the lens 48. Also light reflected by the disk 50 is also made incident upon the diffraction grating 44 with paralleled. The 0-order light T of the light which has passed through the diffraction grating 44 does not generate the astigmatism. Therefore, the track error signal can be detected by using the element 52b. Since the 1-order light K is caused to have the astigmatism by the diffraction grating, the focus error signal can be detected by the element 52. The magneto-optic signal can be detected similarly to the above-described method.

Figure 13:
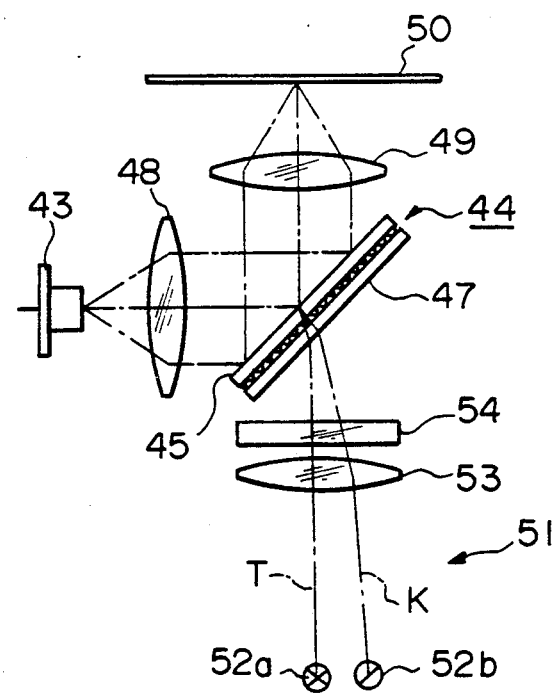
FIG. 13 is a structural view which illustrates a fifth embodiment of the present invention.

A fifth embodiment will be described with reference to FIG. 13. Also this embodiment is arranged to overcome the third problem.

Figure 12:
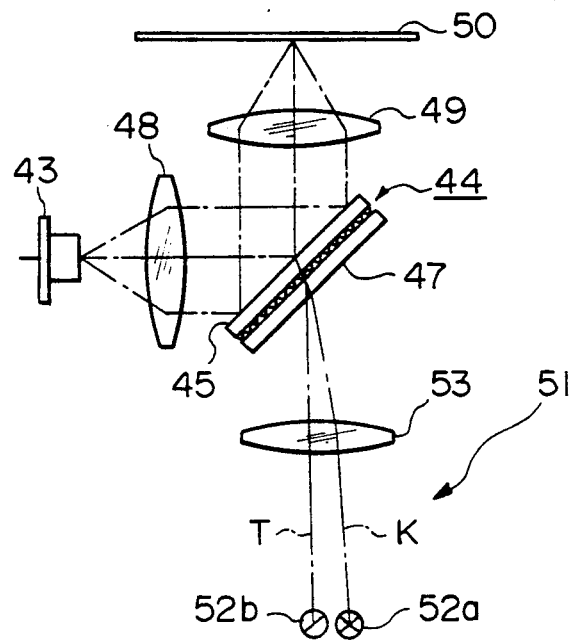
FIG. 12 is a structural view which illustrates a fourth embodiment of the present invention.
Figure 14A:
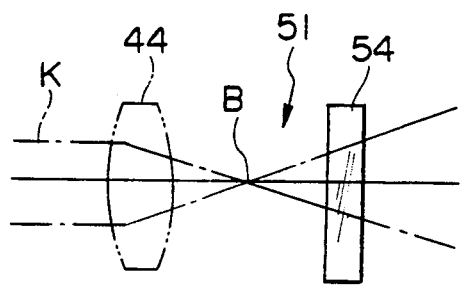
FIG. 14A illustrates one structural view of a cylindrical lens in a signal detecting optical system.
Figure 14B:
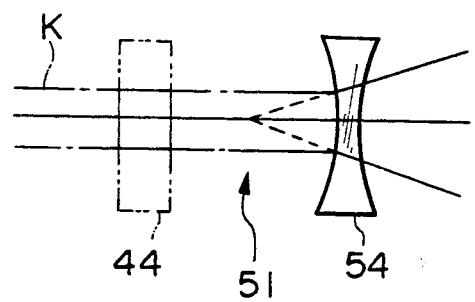
FIG. 14B illustrates a structural view of the cylindrical lens in a direction perpendicular to that of FIG. 14A.

According to this embodiment, a cylindrical lens 54 is disposed between the diffraction grating 44 and the lens 53 according to the second embodiment (see FIG. 12). As shown in FIG. 14A viewed from a direction in parallel to the drawing sheet, the 1-order light K is converged by the diffraction grating 44 in the direction of the drawing sheet. If convergent point B and the focal point of the concave lens 54 coincide with each other, the 1-order light K which has passed through the lens 54 does not have an astigmatism. FIG. 14B illustrates a state when the optical system 51 is viewed in a perpendicular direction to the drawing sheet. Therefore, the track error signal can be detected by arranging the structure in such a manner that the 1-order light K not having the astigmatism is detected by the element 52b. Furthermore, since the 0-order light T has astigmatism by the lens 54, the focus error signal can be detected by using the element 52a.

Figure 16:
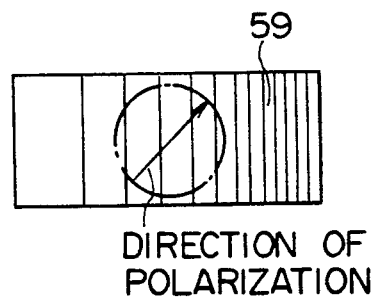
FIG. 16 is a front elevational view which illustrates the modulation pitched grating.
Figure 17:
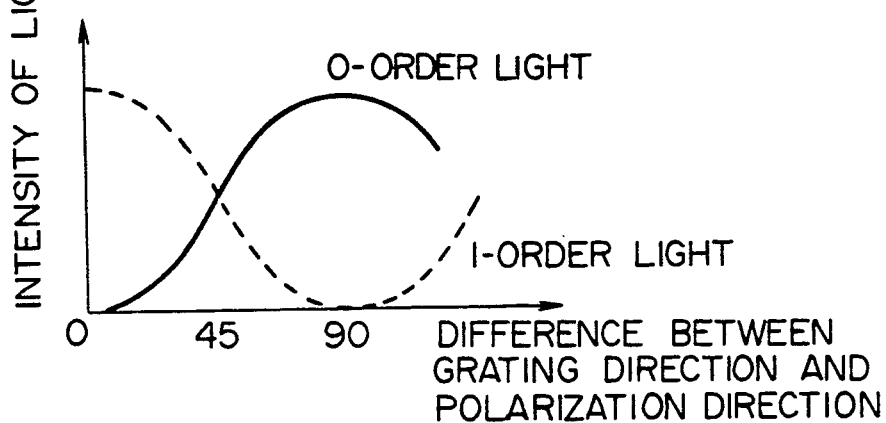
FIG. 17 is a characteristic drawing which illustrates the polarization dependency of the diffraction grating.

Then, a sixth embodiment will be described with reference to FIGS. 15 to 17. This embodiment is arranged so as to overcome the fourth and fifth problems.

The overall structure of the sixth embodiment will be described with reference to FIG. 15. A prism 58 comprising a wedge shaped non-parallel substrate 57 is disposed on the optical path through which a laser light emitted from the semiconductor laser 55 and passed through the collimate lens 56 passes. The substrate 57 has a diffraction grating 59 formed on one side thereof, which the pitch thereof is, as shown in FIG. 16, modulated and which serves as the first diffraction member. Furthermore, a total reflecting surface 60 is formed on the other side of the substrate 57. The diffraction grating 59 has a coating layer 59a on the surface thereof. Assuming that the angle made by the diffraction grating 59 and the total reflecting surface 60 with respect to the plain face is $\alpha$ and $\beta$, respectively, the wedge angle can be expressed by $\beta - 60$. An objective lens 61 is disposed in a side of the diffraction grating 59 of the prism 58. A magneto-optical disk 62 serving as an optical information recording medium is disposed adjacent to the lens 61. Two light receiving devices 64 and 65 for detecting the reflected light from the disk 62 are disposed on the optical path in a side of the optical system 63 on which the laser 55 is disposed.

Light emitting from the laser 55 is made parallel by the lens 56, then is introduced into the diffraction grating 59 which the diffraction efficiency is changed depending upon the direction of polarization of the prism 58. The diffraction grating 59 has a coating layer 59a so as to have the polarization dependent characteristics as shown in FIG. 17 and a desired reflectivity for the purpose of irradiating the disk 62 proper optical power. A portion of the parallel light from the lens 56 is reflected by the coating layer 59a so as to travel toward the lens 61. Another portion of the parallel light, which has not been reflected and transmitted as it is, is divided into the 0-order light T and the 1-order light K by the diffraction grating 59 so as to travel toward the total reflecting surface 60. Since the total reflecting surface 60 is arranged not to be in parallel to the diffraction grating 59 but is arranged to be in the form of a wedge, a light reflected by the total reflecting surface 60 is not made parallel to the light reflected by the coating layer 59a, but is passed into a different direction so as to become a separated light. Therefore, the light does not affect badly the light reflected by layer 59a is irradiated to the surface of the disk 62 via the lens 61, so that recording of information can be performed.

A light reflected by the disk 62 reads the recorded information and its polarization direction is rotated by the Kerr effect. Then, the reflected light is again introduced into the diffraction grating 59. The reflected light is divided by the diffraction grating 59 into the 0-order light T and the 1-order light K so as to be reflected by the total reflecting surface 60, then they again pass through the diffraction grating 59 so as to be emitted outwards. As this time, the 0-order light T and the 1-order light K are emitted from the diffraction grating 59 with making a different angle from the parallel light emitted from the laser 55.

The 0-order light T and the 1-order light K pass through the lens 56 so as to be detected by the light receiving device 64 and 65. Since the 1-order light K twice passes through the diffraction grating 59, the deviation of the diffractive angle due to the change in the wavelength can be substantially cancelled. Furthermore, since the diffraction grating 59 is arranged to be in the form of a modulation pitch, the astigmatism can be generated in the 1-order light K. Therefore, the focus error signal can be detected by introducing the 1-order light K into the element 65. Since the astigmatism is not generated in the 0-order light T, the tracking error signal can be stably detected by the push-pull method by introducing the 0-order light into the element 64. Furthermore, the magneto-optic signal can be detected by obtaining the difference in the intensity between the signals detected by the two elements 64, 65. Therefore, the reproducing of information can be performed.

When the structure is, as described above, arranged in such a manner that the direction of polarization of the light emitted from the laser 55 is deviated by 45° from the direction of the gratings of the diffraction grating 59, the usual necessity of providing the λ/2-plate can be eliminated. Furthermore, the spot interval between the 0-order light T and the 1-order light K can be optionally determined by changing the wedge angle of the prism 58. Furthermore, since the focusing sensitivity is determined depending upon the degree of the modulation pitch, a satisfactory design freedom can be obtained. Therefore, the most suitable design of the parts can be enabled. As a result, a compact and high sensitive magneto-optical head can be realize.

Figure 18:
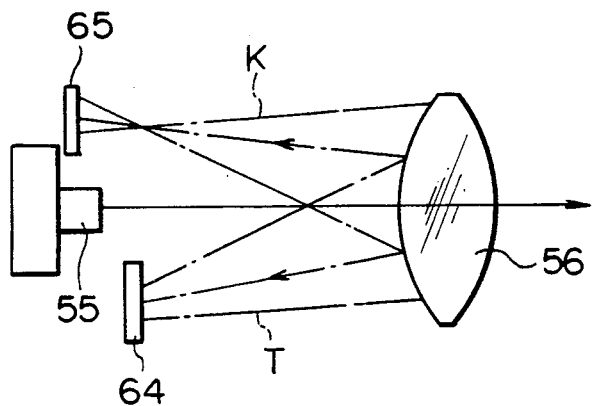
FIG. 18 is a structural view which illustrates a seventh embodiment of the present invention.

Then, a seventh embodiment will be described with reference to FIGS. 18 to 20. The seventh embodiment is arranged so as to overcome the fourth and the fifth problems. The structure of the seventh embodiment is arranged in such a manner that the positions of the elements 64 and 65 according to the above-described the sixth embodiment are shifted. The other structure is the same as the above-described the sixth embodiment.

Figure 19:
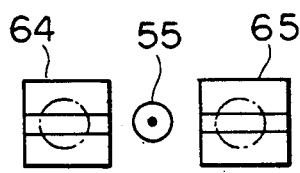
FIG. 19 is a front elevational view which illustrates the configuration of the light receiving element.
Figure 20:
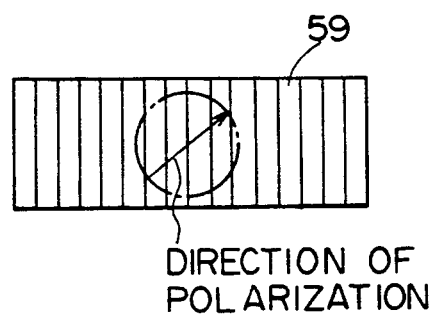
FIG. 20 is a front elevational view which illustrates equi-pitched gratings.

FIG. 19 illustrates the elements 64 and 65 when viewed from the portion in a side of the lens 56. The elements 64 and 65 are divided into three sections and disposed with a certain interval in a direction of optical axis. Therefore, the focus error signal is detected by the beam size method as an alternative to the astigmatic method.

As a result that the signal is detected by the above-described method, the tolerance in assembling the parts and the position adjustment can be enlarged. Therefor, the assembling and adjusting the parts can be easily completed. As a result, a mass production can be obtained. According to the seventh embodiment, since the necessity of the astigmatism can be eliminated, the pitch of the grating 59 can be formed equal. Therefore, the grating 59 can be easily manufactured.

Figure 21:
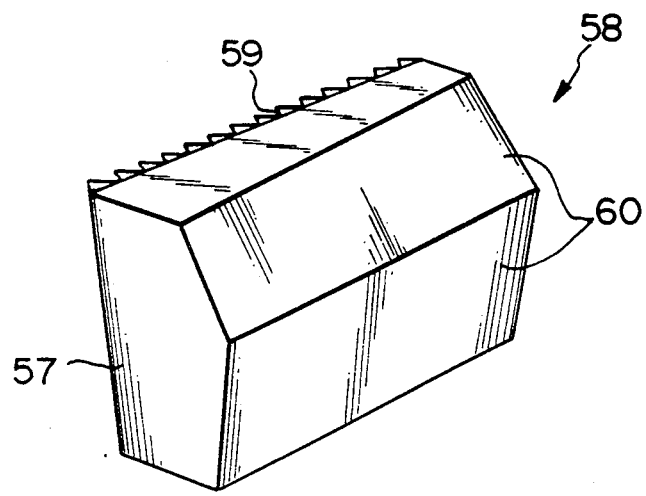
FIG. 21 is a perspective view which illustrates a luminous separating means according to an eighth embodiment of the present invention.
Figure 22:
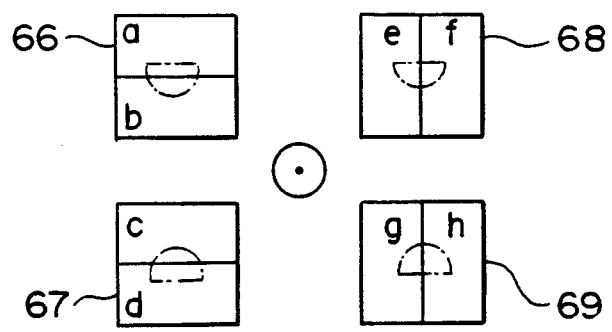
FIG. 22 is a front elevational view which illustrates the configuration of the light receiving element.
Figure 23:
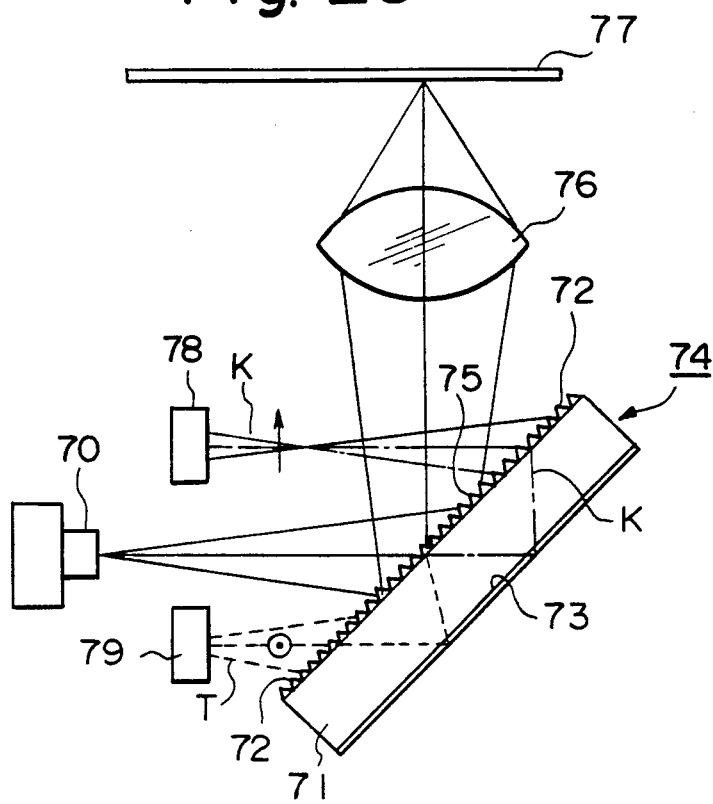
FIG. 23 is a structural view which illustrates a ninth embodiment of the present invention.
Figure 24A:
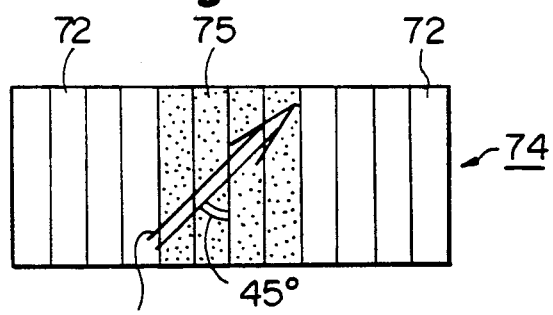
FIG. 24A illustrates one structural view of the diffraction grating.
Figure 24B:
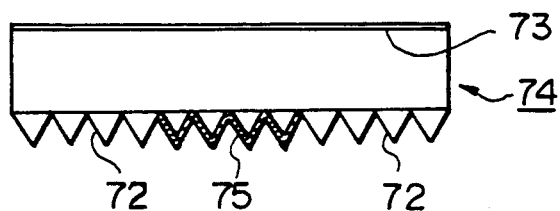

Then, an eight embodiment will be described with reference to FIGS. 21 and 22. The eight embodiment is arranged for the purpose of overcoming the fourth and the fifth problems.

The eight embodiment is arranged in such a manner that the shape of the luminous separating means according to the sixth embodiment (see FIG. 15) is changed. The prism 58 serving as the luminous separating means has the grating 59 for separating the polarization on one side of the substrate 57 and the total reflecting surface 60 formed on the other side of the substrate 57. According to the eight embodiment, the shape of the total reflecting surface 60 is not arranged to be flat, but is arranged to be in the form of a wedge prism as shown in FIG. 21.

Figure 15:
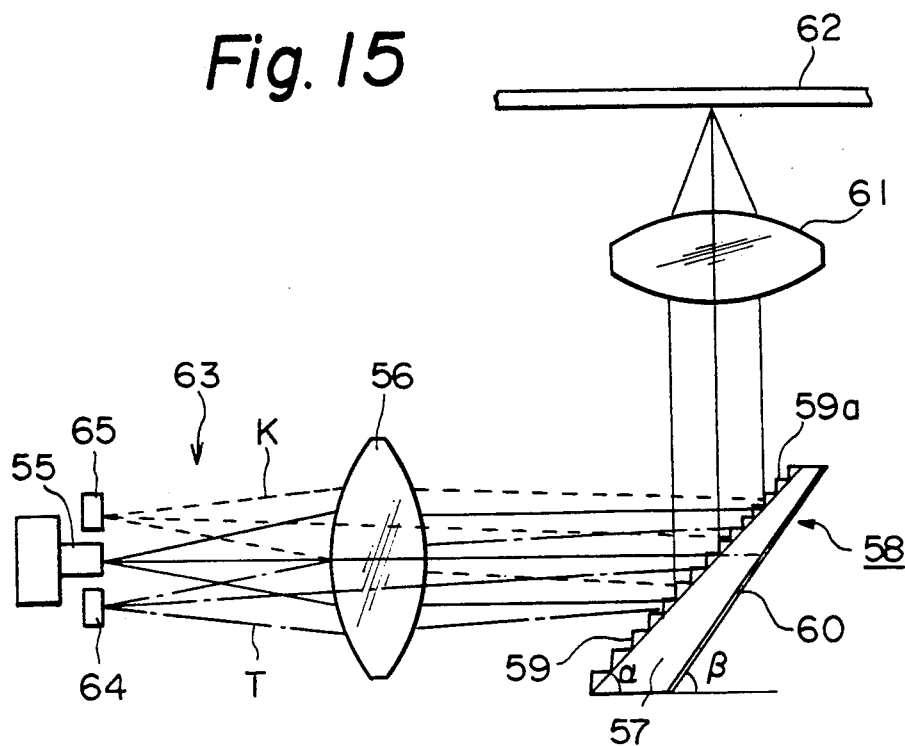
FIG. 15 is a structural view which illustrates a sixth embodiment of the present invention.

As a result, if the overall layout of the optical system is arranged to be the same as that shown in FIG. 15, the light receiving optical system viewed from the portion in a side of the lens 56 is constituted by four two-sectioned light receiving devices 66, 67, 68 and 69. That is, in this case, the focus error signal Of is detected by the double knife edge method by using the two spots determined by the 0-order light T or the 1-order light K. Furthermore, track error signal Tr is detected by the push-pull method by using other two spots (or one spot). Magneto-optic signal Mo can be detected by utilizing the difference in the light intensity between the 0-order light T and the 1-order light K. Therefore, as a result of detecting the signals as described above, the elements 66, 67, 68 and 69 can be disposed on the same plane, so that can be integrally formed. In addition, since the double knife edge method is employed to detect the focus error signal, an advantage can be obtained in that the influence of the wavelength change can be reduced in comparison to the astigmatic method.

Then, a ninth embodiment will be described with reference to FIGS. 23, 24A, 24B, 25A and 25B. The ninth embodiment is arranged for the purpose of overcoming the fourth and the fifth problems.

A transmissive type diffraction grating 72 is formed on one side of a parallel substrate 71 on the optical path through which a laser light emitted from the semiconductor laser 70 passes. On the other side of the parallel substrate 71, a luminous separating device 74 having a total reflecting surface 73 formed thereon is disposed. A semi-transmissive type diffraction grating 75 serving as a semi-reflecting film is formed in a portion of the central portion of the diffraction grating 72. A magneto-optical disk 77 serving as the optical information recording medium is disposed on the optical path through which a light reflected by the diffraction grating 75 passes via an objective lens 72. A first light receiving element 78 is disposed on the optical path through which the 1-order light K reflected by the disk 77 and diffracted by the element 74, passes. Furthermore, a second light receiving device 79 is disposed on the optical path through which the 0-order light T traveling after diffracted by the device 74, passes.

Light emitted from the laser 70 passes toward the element 74 with the form of a diffused light. A light made incident upon the device 74 is partially reflected by the diffraction grating 75 having high reflectivity so as to be converged by the lens 76, then irradiated to the surface of the disk 77. As a result, the recording of information or the like is performed.

A light reflected by the disk 77 becomes in the state that the polarization thereof is rotated in response to the signal by the Kerr effect, subject to the recorded information reading process. Then, the light is again introduced into the diffraction grating 75 of the element 74. The light is divided into the 0-order light T and the 1-order light K due to the passing of the diffraction grating 75, then are independently reflected by the total reflecting surface 73. After that, the 1-order light K passes through the diffraction grating 72 so as to be emitted outward, then introduced into the element 78. The 0-order light T passes through the diffraction grating 72 positioned independently so as to be emitted outwards, then introduced into the device 79.

Figure 25A:
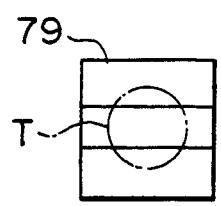
FIG. 25A illustrates the surface of the light receiving element 79.
Figure 25B:
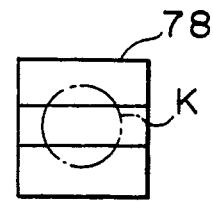

As shown in FIGS. 25A and 25B, the devices 78 and 79 are respectively divided into three sections. Therefore, the focus error signal can be detected by the beam size method, while the track error signal can be detected by the push-pull method. The magneto-optic signal can be detected by obtaining the difference between signal outputs detected by the elements 78 and 79. In the case where the magneto-optic signal is detected in the above-described method, it is necessary to adjust the direction of polarization of the light emitted from the laser 70 and the direction of the grating so as to make a crossing angle thereof 45°.

As described above, according to this embodiment, the diffraction gratings 75 and 72 are provided for the device 74, the 0-order light T and the 1-order light K emit outwards by the diffraction grating 72 after reflected by the total reflecting surface 73, the 0-order light T and the 1-order light K being formed by making the light reflected by the disk 77 incident upon the diffraction grating 75 of the element 74. Therefore, the light utilization efficiency can be significantly improved in comparison to the conventional structure. Furthermore, a small size, light weight and low cost optical head can be obtained.

Furthermore, if the structure is arranged in such a manner that a collimate lens (not shown) is disposed on the optical path through which a laser light emitted from the laser 70 passes, the light emitted from the laser 70 is introduced into the element 74 after it has passed through the collimate lens. Therefore, only the parallel light of all emitted light is made incident upon the diffraction grating 75. As a result, a significantly improved polarization separation can be achieved. Therefore, the light utilization efficiency can be further improved.

Then, a modification for detecting the signals by using the elements 78 and 79 will be described.

Figure 26A:
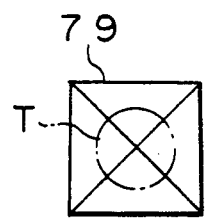
FIG. 26A is a front elevational view which illustrates a modification to light receiving element 79.
Figure 26B:
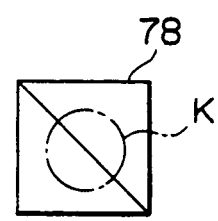
FIG. 26B is a front elevational view which illustrates a first modification to light receiving element 78.
Figure 27A:
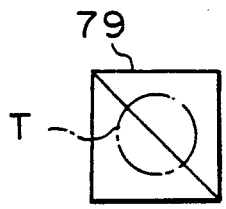
FIG. 27A is a front elevational view which illustrates a second modification to light receiving element 78.
Figure 27B:
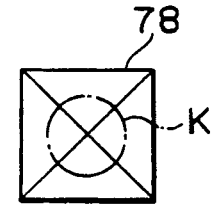
FIG. 27B is a front elevational view which illustrates a second modification to light receiving element 7B.
Figure 28:
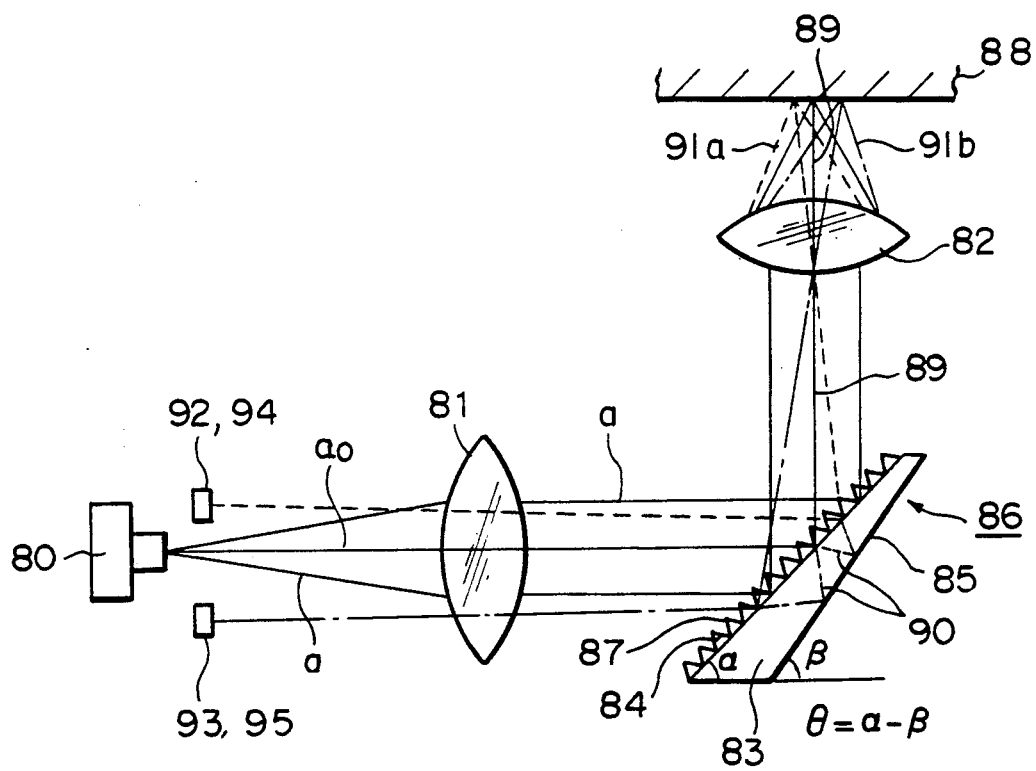
FIG. 28 is a structural view which illustrates a tenth embodiment of the present invention.

A first modification arranged in such a manner that the astigmatic method is utilized for detecting the focus error signal will be described. FIGS. 26A and 26B illustrate the above-described structure. The element 79 for detecting the 0-order light T shown in FIG. 26A is divided into four sections. Furthermore, the astigmatism in the 0-order light is generated by arranging the thickness, the inclination and the refractive index of the element 74. In addition, the above-described 4-sectioned device 79 is arranged on an optimum position so as to enable the focus error signal to be detected by the astigmatic method. On the other hand, the element 78 for detecting the 1-order light K is arranged to be a two-sectioned shape so that the track error signal can be detected by the push-pull method.

As a second modification, another may in which the astigmatism is utilized for the purpose of detecting the focus error signal will be described. According to the second modification, at least one of the diffraction grating 75 and 72 is arranged to be a modulated pitch so as to generate the astigmatism in a side of the 1-order light K. In this case, since the degree of modulation of the grating pitch adjusts the focusing sensitivity to be most preferable, the design freedom can be further enlarged in comparison to the astigmatic method according to the first modification.

The focus error signal can be detected by either the beam size method or the astigmatic method. The track error signal can be detected by the above-described continuous method and a sample servo method. Since the diffraction grating 72 disposed in one side region through which only the 0-order light T passes is arranged in such a manner that only the 0-order light passes through it, it can be omitted from the overall structure if the problem of manufacturing is not arisen. Although the substrate of the element 74 is arranged to be the parallel flat plate, it may be arranged to be a wedge prism shape for the purpose of making suitable the interval between the elements 78 and 79.

Then, a tenth embodiment will be described with reference to FIGS. 28 to 32.

This embodiment is arranged for the purpose of overcoming the fourth and the fifth problems.

A polarization separating diffraction grating 84 is formed on one side of a substrate 83 on an optical path while light a emitted from the semiconductor laser 80 serving as the laser light source passes through a collimate lens 81 toward an objective lens 82. Furthermore, a wedge shaped luminous separating element 86 serving as the luminous separating means, on which a total reflecting surface 85 is formed, is disposed on the other side of the substrate 83. A semi-reflecting film 87 is formed on a surface of the diffraction grating 84. An optical disk 88 serving as the optical information recording medium is, via the lens 82, disposed on the optical path through which the light reflected by the semi-reflecting film 87 passes.

Figure 29:
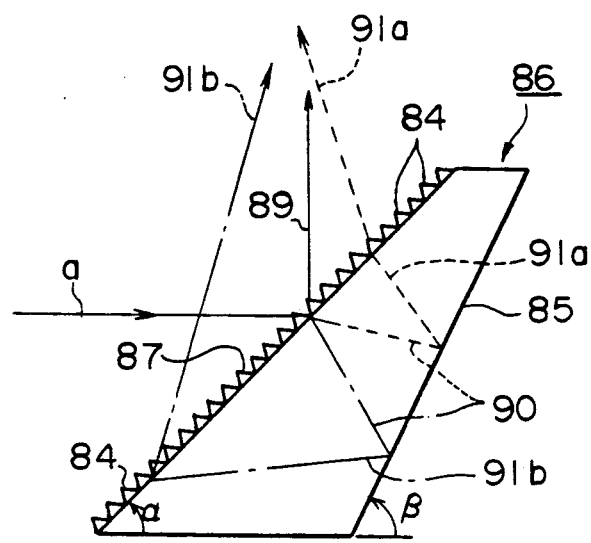
FIG. 29 illustrates the optical path in an emitted light luminous separating means.

In this case, the angle $\theta$ of the wedge of the wedge shaped element 86 is determined so as to introduce into the disk 88 one reflected light 89 obtained due to the reflection on the semi-reflecting film 87 and two transmitted light 90, 91a and 91b obtained due to the transmission in the semi-reflecting film 87 (see FIG. 29). The wedge angle $\theta$ can be expressed by $\theta = \alpha - \beta$ provided that the angle made by the surface on which the diffraction grating 84 is formed and the horizontal surface is $\alpha$ and the angle made by the surface on which the total reflecting surface 85 is formed and the horizontal surface is $\beta$.

Figure 30:
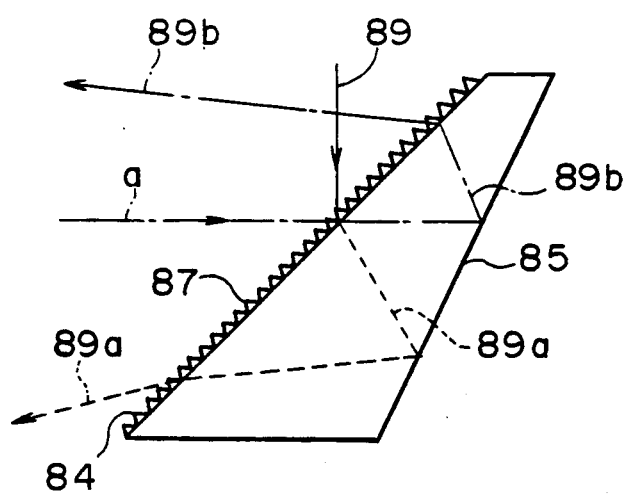
FIG. 30 illustrates an optical path in the luminous separating means for return light from an optical information recording medium.
Figure 31:
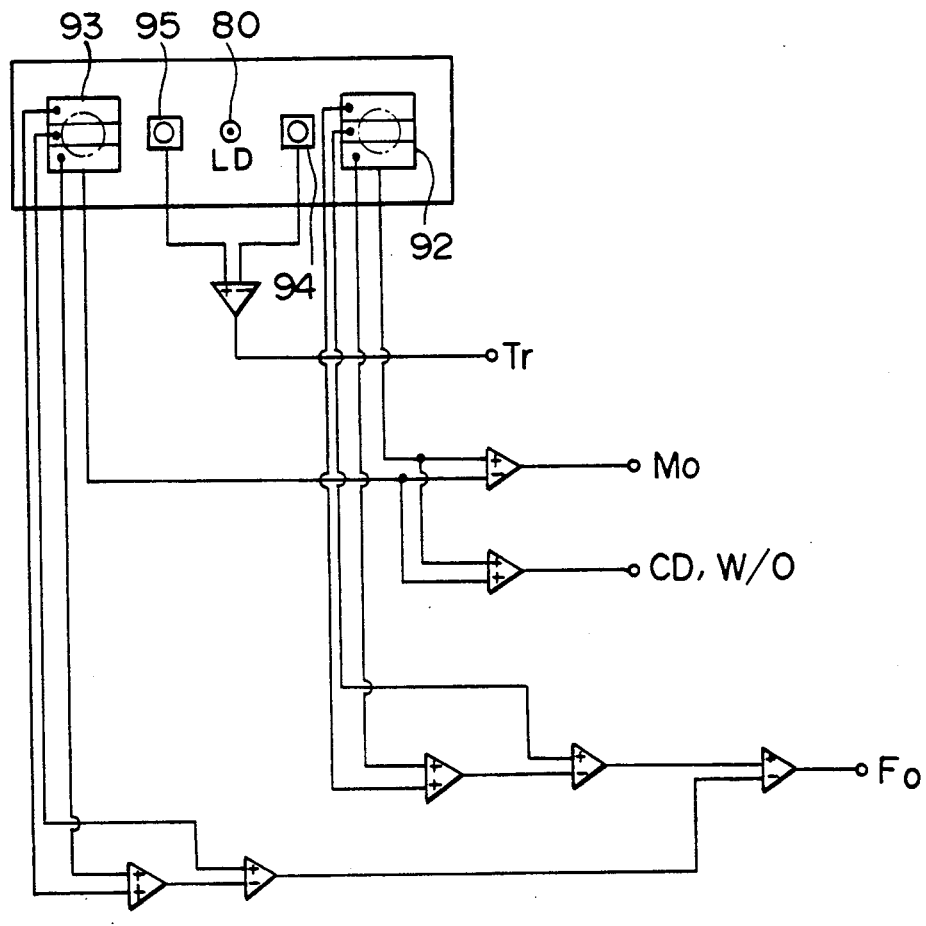
FIG. 31 is a circuit diagram which illustrates a circuit connected to a non-divided and 3-sectioned light receiving element.
Figure 32:
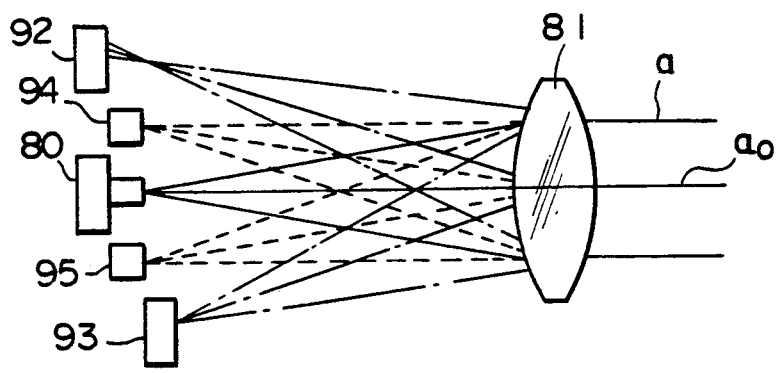
FIG. 32 illustrates an optical path which illustrates the positional relationship between the non-divided light receiving element and the 3-sectioned light receiving element on the optical path.

As shown in FIGS. 30 to 32, two 3-sectioned light receiving elements 92 and 93 for receiving the reflected light 89 of the reflected light (main beam) 89 reflected by the disk 88 and the transmitted lights (sub-beam) 91a and 91b, and two non-sectioned light receiving elements devices 94 and 95 for receiving the transmitted light 91a laser 80.

A laser light emitted from the laser 80 is made parallel by the lens 81 and is made incident upon the surface of the means 86 on which the diffraction grating 84 is formed. At this time, it is provided that the emitted light a is linearly polarized by making an angular degree of 45° with respect to the direction of the grating (perpendicular to the drawing sheet) of the diffraction grating 84, the emitted light a is, as shown in FIG. 29, reflected in part by the semi-reflecting film 87 so as to be irradiated to the surface of the disk 88 as the reflected light 89 (to be called "a main beam 89" hereinafter). The transmitted light 90 (to be called "a sub-beam 90" hereinafter) which has passed through the semi-reflecting film 87 is divided into a 0-order light 91a (transmitted light) and an 1-order light 91b (diffracted light) by the diffraction grating 84.

The 0-order light 91a is reflected by the total reflecting surface 85 and again passes through the diffraction grating 84. At this time, since the total reflecting surface 85 is deviated from the surface, on which the diffraction grating 84 is formed, by the wedge angle $\theta$, the 0-order light 91a is not made parallel to the main beam 89, but passes toward the lens 82 by making a desired angle. The 1-order light 91b is diffracted by the diffraction grating 84 before it is reflected by the total reflecting surface 85 so as to be again diffracted by the diffraction grating 84. Since the total reflecting surface 85 has the wedge angle $\theta$, the incidental angle when the light 91b passes through the diffraction grating 84 at the second time becomes enlarged. Since also the diffraction angle is enlarged, the 1-order light 91b is not made parallel to the main beam 89, but is passed toward the lens 82 with a desired angle. Therefore, the one main beam 89 (reflected light) and the two sub-beams 90 (the 0-order light 91a and the 1-order light 91b) are converged by the lens 82 so as to form three spots to thereby be irradiated to the surface of the disk 88. As a result, the information recording can be performed and the triple beam tracking can be performed.

The three beams (one main beam 89 and two sub-beams 91a and 91b) reflected by the disk 88 pass through the lens 82 so as to be made incident upon the semi-reflecting film 87 of the element 86. The two sub-beams 91a and 91b are reflected by the semi-reflecting film 87 so as to be converged by the lens 81 and received by the two elements 94 and 95 as shown in FIG. 31. As a result, the track error signal Tr can be detected from the difference in the light intensity.

The one main beam 89 reflected by the disk 88 passes through, as shown in FIG. 30, the semi-reflecting film 87 (a portion of the main beam 89 is reflected) so as to be divided into the transmitted light 89a and the diffracted light 89b by the diffraction grating 84 in their directions of the polarization. The transmitted light 89a is totally reflected by the total reflecting surface 85 before the light 89a again passes through the diffraction grating 84 so as to travel toward the elements 92 and 93. The transmitted light 89a is not made parallel to an optical axis ae of the emitted light a due to its reflection on the wedge shaped surface, but is made incident upon the lens 81 with a predetermined angle. As a result, the transmitted light 89a is detected by the element 92 after the light 89a has been converged by the lens 81. The diffracted light 89b is reflected by the total reflecting surface 85 before the light 89b travels toward the diffraction grating 84. The diffracted light 89b is made incident upon the diffraction grating 84 by making a smaller angle than that at the first incident due to the reflection on the surface of the wedge shape. Therefore, the diffracted light 89b is emitted with a small diffraction angle. Also in this case, the diffracted light 89b is not made parallel to the optical axis of the emitted light a, but is made incident upon the lens 81 with making a predetermined angle so as to be converged. As a result, it is detected by the other element 93. Thus, the main beam 89 is divided into the transmitted light 89a and the diffracted light 89b. Therefore, magneto-optic signal Mo can be detected by utilizing the difference in the light intensity between the light 89a and the light 89b. Thus, information recorded on the disk 88 can be reproduced.

FIG. 32 illustrates the positional relationship among the above-described devices 94, 95 and the two elements 92 and 93. In this case, the main beam 89 is detected by the two devices 92 and 93 disposed in front and in the rear in the direction of the optical axis ao and having different focal distances with each other. Therefore, the focus error signal Fo can be detected by the beam size method.

As described above, the main beam 89 is detected by the elements 92 and 93, while the sub-beam 90 is detected by the elements 94 and 95. As a result, the magneto-optic signal Mo, the focus error signal Fo and the track error signal Tr can be detected. As the track error signal Tr the triple beam method, the push-pull method and the sample servo method can be used. As a result, the present invention can be applied to a variety of the disks 88.

Furthermore, since the element 86 is arranged to be in the form of a wedge, the triple beam operation can be realized. Therefore, the triple beam tracking method can be employed. Therefore, an optical pickup which can compatibly correspond to a variety of media of the magneto-optical disk with reduced size and weight can be obtained.

An eleventh embodiment will be described with reference to FIGS. 33 to 37. This embodiment is arranged for the purpose of overcoming the sixth problem. The same parts as those according to the related art (see FIG. 3) are omitted from the description made hereinafter.

Figure 34:
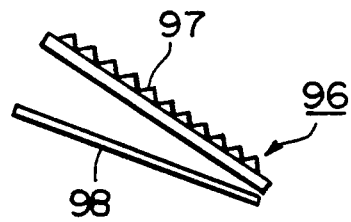
FIG. 34 is a side elevational view which illustrates the luminous separating means in FIG. 33.

A luminous separating element 96 serving as the luminous separating means has, as shown in FIG. 34, a transmissive type diffraction grating 97 and a high reflecting surface 98 disposed by making a predetermined angle $\Delta\theta$ (a wedge angle) with respect to the transmissive type diffraction grating 97. The element 96 is positioned on the optical path through which light emitted from a semiconductor laser 99 serving as the laser beam source travels toward the collimate lens 100.

A light reflected by a magneto-optical disk 101 successively passes through an objective lens 102 and a lens 100 before the light is made incident upon the diffraction grating 97 of the device 96 so as to be divided into the transmitted light T and the diffracted light K. The transmitted light T is reflected by the high reflecting surface 98 so as to be again irradiated by the diffraction grating 97. As a result, the transmitted light T becomes light which has been subjected to the transmission twice. The diffracted light K is reflected by the high reflecting surface 98 so as to be again diffracted by the diffraction grating 97. As a result, the diffracted light K becomes light which has been subjected to the diffraction twice.

The diffraction conditional equation for the diffracted light K can be expressed by the following equation (see FIG. 35):

$$\sin\theta i + \sin\theta o = \lambda/\Lambda \qquad (1)$$

$$\sin(\theta o - 2\Delta\theta) + \sin\theta l \qquad (2)$$

where
$\theta i$: incidental angle
$\Delta\theta o$: diffraction angle at the first time
$\theta l$: wedge angle
$\lambda$: diffraction angle at the second time
$\Lambda$: pitch of the diffraction grating Then, $\theta l$ is obtained by the following equation:

$$\theta_1 = \sin^{-1}[\lambda/\Lambda - \{(\lambda/\Lambda) - \sin\theta i\}\cos 2\theta + \sqrt{1 - \{(\lambda/\Lambda) - \sin\theta i\}^2}\sin 2\theta] \qquad (3)$$

Then, a diffraction axial deviation angle $\Psi d$ and a transmission axis deviation angle $\Psi t$ are respectively defined as follows:

$$\Psi d = (incidental\ angle) - (diffraction\ angle\ at\ the\ second\ time) = \theta i - \theta l \qquad (4)$$

$$\Psi t = 2\Delta\theta \qquad (5)$$

Then, angular difference (separation angle) $\Psi s$ between the diffracted light K which has been diffracted twice and the transmitted light T which has been transmitted twice can be obtained by using Equations (4) and (5) as follows:

$$\Psi s = \Psi d - \Psi t = \theta i - \theta l - 2\Delta\theta \qquad (6)$$

Figure 33:
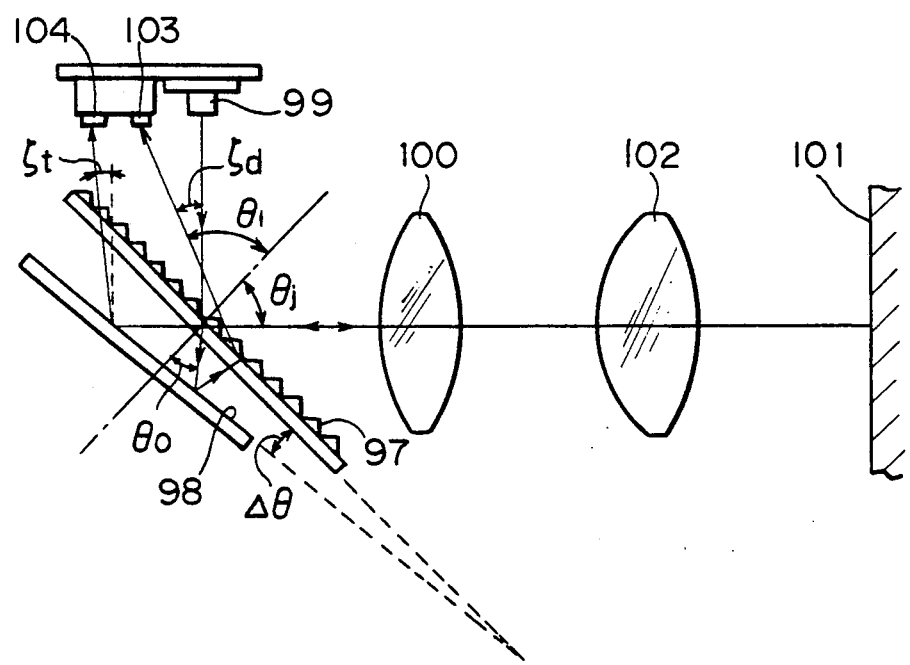
FIG. 33 is a structural view which illustrates an eleventh embodiment of the present invention.

Therefore as shown in FIG. 33 two light receiving devices 103 and 104 can be disposed adjacent to the laser 99. Therefore, the substrate for the semiconductor laser and that the substrate for the light receiving element can be independently manufactured. Therefore, since the laser 99 and the elements 103 and 104 can be individually mounted, the assembling and the adjusting operations can be easily completed.

The elements 103 and 104 may be arranged in such a manner that one of the two elements is made a 4-sectioned light receiving surface 105 and the other element is made a 2-sectioned light receiving surface 106. The track error signal can be detected by the surface 106 by utilizing the push-pull method. The focus error signal can be detected by the surface 105 by utilizing the astigmatic method. In a case where the sample servo tracking is employed, the 2-sectioned light receiving surface may be arranged to be a non-sectioned surface. The light receiving surface shown in FIG. 37A is arranged to detect the focus error signal by utilizing the beam size method. In a case where the track error signal is detected by utilizing the push-pull method, the track error signal can be detected depending upon the difference in the light quantity between the right and the left portions by drawing a separation line 107 designated by a dotted line. In the case of the sample servo tracking, the separation line 107 can be eliminated.

A modification to this embodiment is shown in FIG. 38.

According to the above-described embodiment, the diffraction grating 97 and the high reflecting surface 98 constituting the means 96 are separated from each other as shown in FIG. 34. According to this modification, the diffraction grading 97 is formed on one side of a wedge 108 having a predetermined angle $\Delta\theta$, and the high reflecting surface 98 is formed on the other side thereof. According to this modification, a similar effect can be obtained.

Many widely different embodiments of the present invention may be constructed without departing from the spirit and scope of the present invention. It should be understood that the present invention is not limited to the specific embodiments described in this specification, except as defined in the appended claims.

What is claimed is:

1. An optical information recording/reproducing apparatus, comprising:
    a light source for emitting a laser light;
    a semi-reflecting means disposed on an optical path of said emitted laser light for receiving said emitted laser light, for reflecting said received laser light toward an optical information recording medium in order to record an information, and for transmitting a reflected laser light reflected by said optical information recording medium;
    a separating means having integrally said semi-reflecting means on one surface thereof and at least one diffraction grating, said at least one diffraction grating being adapted to separate said laser light transmitted by said semi-reflecting means into a diffracted light and a transmitted light and then subsequently diffracting said diffracted light again to produce twice diffracted light and transmitting said transmitted light again to produce twice transmitted light; and
    two detecting means being adapted to detect respectively said twice diffracted light and said twice transmitted light, one of said detecting means generating a track error signal, the other of said detecting means generating a focus error signal both of said detecting means generating an information reproduction signal.

2. An apparatus according to claim 1, wherein said separating means has a first diffraction grating and a second diffraction grating, said first diffraction grating being adapted to separate said laser light transmitted by said semi-reflecting means into said diffracted light and said transmitted light, and said second diffraction grating being adapted to diffract said diffracted light again and transmit said transmitted light again.

3. An apparatus according to claim 1, wherein said separating means has a diffraction grating and a total reflecting surface, said diffraction grating being adapted to separate said laser light transmitted by said semi-reflecting means into said diffracted light and said transmitted light, said total reflecting surface being adapted to reflect said diffracted light and said transmitted light, and said diffraction grating being adapted to diffract again said diffracted light reflected by said total reflecting surface and transmit again said transmitted light reflect by said total reflecting surface.

4. An apparatus according to claim 1, wherein said semi-reflecting means comprises a semi-reflecting film.

5. An apparatus according to claim 1, wherein said two detecting means are a first light receiving element disposed on an optical path of said twice diffracted laser light and a second light receiving element disposed on an optical path of said twice transmitted laser light.

6. An apparatus according to claim 2, wherein said separating means comprises a transmissible substrate, said first diffraction grating is disposed on one surface of said substrate, said second diffraction grating is disposed on the other surface of said substrate, said semi-reflecting means is disposed on said first diffraction grating, and said detecting means is arranged so as to oppose to said second diffraction grating.

7. An apparatus according to claim 3, wherein said separating means comprises a transmissible substrate, said diffraction grating is disposed on one surface of said substrate, said total reflecting surface is disposed on the other surface of said substrate, said semi-reflecting means is disposed on said diffraction gratings, and said detecting means is arranged so as to oppose to said diffraction grating.

8. An apparatus according to claim 7, wherein said semi-reflecting means is disposed on a part of said diffraction grating.

9. An apparatus according to claim 2, wherein said separating means comprises a first transmissible substrate and a second transmissible substrate arranged so as to be kept apart from said first substrate, said first diffraction grating is disposed on one surface of said first substrate opposing to said second substrate, said second diffraction grating is disposed on one surface of said second substrate opposing to said first diffraction grating, said semi-reflecting means is disposed on the other surface of said first substrate, and said detecting mean is arranged so as to oppose to the other surface of said second substrate.

10. An apparatus according to claim 9, wherein said semi-reflecting means comprises a semi-reflecting polishing surface.

11. An apparatus according to claim 3, wherein said separating means comprises a transmissible wedge shaped substrate, said diffraction grating is disposed on one surface of said wedge shaped substrate, said total reflecting surface is disposed on the other surface of said wedge shaped substrate, said semi-reflecting means is disposed on said diffraction grating, and said detecting means is arranged so as to oppose to said diffraction grating.

12. An apparatus according to claim 11, wherein a wedge angle of said wedge substrate is determined in such a manner that one main beam reflected by said semi-reflecting means and two sub-beams transmitted by said semi-reflecting means are introduced into said optical information recording medium.

13. An apparatus according to claim 12, wherein said detecting means comprises two 3-sectioned light receiving elements receiving said main beam and two non-sectioned light receiving elements receiving said sub-beams.

14. An apparatus according to claim 11, wherein said wedge shaped substrate is in the shape of a wedge shaped prism.

15. An apparatus according to claim 3, wherein said separating means comprises a transmissible substrate and a high reflecting surface arranged so as to be a predetermined angle with respect to said substrate and opposing to one surface of said substrate, said diffraction grating is disposed on the other surface of said substrate, and said semi-reflecting means is disposed on said diffraction grating.

16. An apparatus according to claim 1, which further comprises a collimating lens being adapted to collimate said reflected laser light reflected by said semi-reflecting means and an objective lens being adapted to converge said collimated laser light on said optical information recording medium.

17. An apparatus to claim 16, which further comprises a collimating lens being adapted to collimate said emitted laser light.

18. A dual type diffracting element used in an optical information recording/reproducing apparatus, comprising:

a first transmissible substrate;

a second transmissible substrate arranged so as to be kept apart from said first substrate;

a first diffraction grating disposed on one surface of said first substrate opposing to said second substrate;

a second diffraction grating disposed on one surface of said second substrate opposing to said first diffraction grating; and a semi reflecting means disposed on the other surface of said first substrate.

* * * * *